United States Patent Office 3,736,173
Patented May 29, 1973

---

3,736,173
METHOD OF PREPARING CURABLE POLYOLEFIN GRANULES CONTAINING A CROSS-LINKING AGENT
Masaaki Okada, Hayashi Takemori, Toshio Kita, Toshiaki Nakai, Masaaki Ohtsuji, Yasuhiro Fujiwara, Shoji Tamura, and Kozo Morita, Amagasaki, Japan, assignors to Dainichi-Nippon Cables, Ltd., Amagasaki-shi, Japan
Continuation of abandoned application Ser. No. 769,048, Oct. 21, 1968. This application Jan. 18, 1971, Ser. No. 107,574
Claims priority, application Japan, Oct. 20, 1967, 42/67,577
Int. Cl. B32b 27/26, 27/32
U.S. Cl. 117—100 C                8 Claims

ABSTRACT OF THE DISCLOSURE

A method of preparing curable polyolefin granules comprising stirring polyolefin granules and a crosslinking agent in a high speed stirring apparatus to locally fuse the surfaces of the polyolefin granules by the friction and collision of polyolefin granules, while preventing cohesion of the polyolefin granules with each other, and to cause the crosslinking agent to penetrate and diffuse into the granules of polyolefin.

---

CROSS-REFERENCE TO RELATED APPLICATION

This application is a continuation of the prior copending application Ser. No. 769,048, filed by the present applicants on Oct. 21, 1968, and now abandoned.

This invention relates to preparing curable polyolefin granules economically and without giving excessive thermal history by causing "an organic peroxide crosslinking agent with or without crosslinking coagent" (hereinafter referred to simply as crosslinking agent) to penetrate and diffuse into granules of polyolefin such as polyethylene granules, and to a method of producing extruded articles of crosslinked polyolefin with said curable polyolefin granules.

In accordance with the carrying forward of this invention there is appended hereto certain drawings wherein:

FIG. 6b is a side view, in partial section, of the upper blades of FIG. 6a;

FIG. 7b is a side view, in partial section of the lower blades of FIG. 7a.

Figure 1:
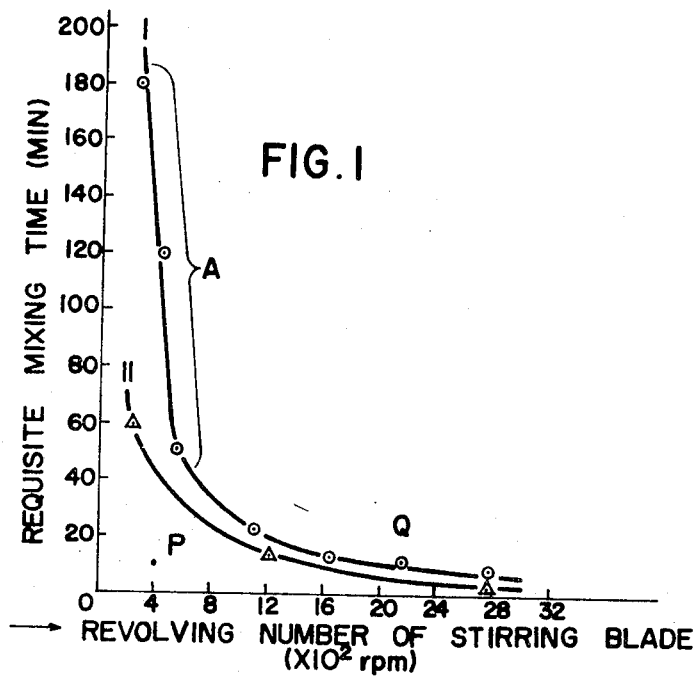
FIG. 1 is a chart illustrating the relationship of different working temperatures between mixing time and revolving speed of the stirring blades of a Henschel mixer, as it relates to the penetration and diffusion of agent into granules of poleolefin.

On crosslinking polyolefin, e.g., polyethylene, with a crosslinking agent, it is necesary to uniformly disperse the crosslinking agent in the polyolefin, and curable polyolefin granules have thereto been prepared by a method (1) in which a polyolefin and crosslinking agent are plasticated and mixed on a two roll mill and granulating the resulting band into granules using a pelletizer, or a method (2) in which a polyolefin and crosslinking agent are first premixed using a subsidiary mixer, such as ribbon blender or high-intensity, vortical-action mixer and then plasticated and mixed using a double screw continuous mixer from which granules are made, or a method (3) in which a polyolefin and crosslinking agent are mixed using a Banbury mixer and thereafter granulated using a two roll mill and a pelletizer.

However, the above methods (1) and (3) have the shortcoming that the composition is apt to get mixed with foreign matter in the milling or mixing stage to form curable polyolefin granules which will give a crosslinked polyolefin insulated electric cable with a deteriorated dielectric property, the cost of the equipment is high and the production rate is low. In the method (2), the intrusion of foreign matters, which is a shortcoming of the method (1) and (3), is avoidable, but there is a shortcoming that the cost of equipment is enormous. In addition, methods (1), (2) and (3) have the defect that the curable polyolefin granules are apt to suffer unavoidably an excesive thermal history during mixing to give the granules thus obtained a tendency to scorch during extruding, and, accordingly, in the manufacture of extruded articles, e.g., a crosslinked polyethylene insulated electric cable using said granules, the continuous working time of a continuous vulcanizer and the speed of extrusion are restricted.

Recently, there has been proposed a method of blending a polyolefin with a crosslinking agent without giving any excessive thermal history (see Japanese patent specification publication Number 25792/1964 which issued as Japanese Patent No. 501,087 on Sept. 18, 1967). In this method, (i) a liquid crosslinking agent is added to polyolefin powder or granules (the polyolefin and crosslinking agent may have been heated to a temperature above room temperature and below the melting point of polyolefin, for example, as the melting point of dicumyl peroxide which is most frequently used as crosslinking agent is 39° C., the dicumyl peroxide is easily liquefied when heated to a somewhat elevated temperature), or (ii) adding a powdery crosslinking agent together with a liquid binder, such as low molecular weight polyisobutylene or polybutene to polyolefin powder or granules, stirring the resulting mixture by means of a drum tumbler, blender or the like, to cause the crosslinking agent to stick to the surface of polyolefin powder or granules in the case of (i) to cause the powdery crosslinking agent to stick to the surface of polyolefin powder or granules through the liquid binder in the case of (ii), and causing in both cases a small portion of the crosslinking agent to penetrate into the powder or granules of polyolefin. By this method, the disadvantageous effect of excessive thermal history has been eliminated. However, in the case of (i), the greater portion of the crosslinking agent merely sticks on the surface of the polyolefin granules (as indicated in comparative Examples 1 to 3 hereinafter, in accordance with a method as disclosed in the aforesaid Japanese patent specification, the amount of the crosslinking agent penetrated into granules of polyolefin is at most 20 to 30 percent by weight of the total amount of the crosslinking agent incorporated). Accordingly there takes place new problems that: (a) in cases of extruding said polyolefin granules the surface of which has been covered by liquid crosslinking agent, the liquid crosslinking agent on the surface of polyolefin granules serves as lubricant and prevents the compound from being caught by the screw of an extruder and, consequently, fluctuations of extrusion rate and irregularity of the dimensions of extruded articles may occur; (b) it is difficult to transfer the polyolefin granules to an extruder by pneumatic carrier because of a tendency of the polyolefin granules to agglomerate into lumps which is attributable to the fact that the surface of a polyolefin granule is covered by the liquid crosslinking agent; (c) it is difficult to transfer the polyolefin granules to the extruder by pneumatic carrier without causing any nonuniform distribution of the crosslinking agent throughout the compound at a temperature below the melting point of the crosslinking agent because at such a temperature the crosslinking agent stuck on the surface of the polyolefin granules is in the form of powder which is readily separated from the surface of polyolefin granules by the shock of air stream in pneumatic carrier; (d) in cases of transfering the polyolefin granules in any manner other than pneumatic carrier to the extruder, a problem occurs in that as the surface of each granule is covered by the liquid crosslinking agent (or wetted by the liquid crosslinking agent) the polyolefin granules are apt to stick to the wall of apparatus or the crosslinking agent on the surface of polyolefin granules is taken away by the wall of apparatus, and, if transferred at a temperature below the melting point of the crosslinking agent, the crosslinking agent separates from the surface of polyolefin granules in a transferring container or storage container or in the hopper of the extruder due to the microvibration which is unavoidable in operation of extruder because the crosslinking agent is sticking on the surface of polyolefin granules in the form of fine crystals, resulting in an extreme nonuniform distribution of the crosslinking agent. On the other hand, in the case of the manner (ii), namely, in the case where a powdery crosslinking agent is stuck to the surface of polyolefin granules through a liquid binder, such as low molecular weight polyisobutylene or polybutene, there is a disadvantage, in addition to the (a) and (b) as mentioned above, that the procedure is complicated as much as the liquid binder is used and also economically disadvantageous. The method as disclosed in the aforesaid Japanese Patent No. 501,087 has, as mentioned above, the shortcoming that it is necessary to alter the procedure depending on whether the crosslinking agent is added in the state of liquid or in the state of solid (powder) to the polyolefin granules. And, in either way, there are disadvantages as mentioned above, while the method of the present invention is independent of the state of the crosslinking agent and, according to the present invention, such problems as in the prior method have been completely solved by simple means.

A feature of the present invention consists in, in the preparation of curable polyolefin granules, stirring polyolefin granules with crosslinking agent in a high speed stirring apparatus under the conditions of high speed stirring such that there occurs local fusion of the surfaces of the polyolefin granules as a result of friction and collision of polyolefin granules but occurs no cohesion of the granules with each other as to cause the crosslinking agent to penetrate and diffuse into the granules of polyolefin and, thereby, to reduce the residual amount of the crosslinking agent on the surfaces of the polyolefin granules to 0.5 part by weight or less per 100 parts by weight of polyolefin, and another feature consists in, in the production of extruded articles of crosslinked polyolefin out of a curable polyolefin, stirring polyolefin granules with crosslinking agent in a high speed stirring apparatus under the conditions of high speed stirring such that there occurs local fusion of the surfaces of the polyolefin granules as a result of friction and collision of polyolefin granules but occurs no cohesion of polyolefin granules with each other as to cause the crosslinking agent to penetrate and diffuse into the granules of polyolefin and, thereby, to reduce the residual amount of the crosslinking agent on the surfaces of the polyolefin granules to 0.5 part by weight or less per 100 parts by weight of polyolefin, supplying the resulting curable polyolefin granules to extruder by pneumatic carrier, extruding said granules and heating the resulting extruded articles as to effect crosslinking.

Hereupon, the term "stirring at a high speed such that the surfaces of polyolefin granules are molten by the friction and collision of the granules with each other but the granules do not sinter or cohere with each other" means a stirring at such a high speed as follows. When polyolefin granules, and crosslinking agent are charged into a high speed stirring apparatus, such as high-intensity, vortical-action mixer or air mixer, and stirred at a high speed therein, the polyolefin granules come into friction and collision with each other and with the inside wall of mixing tank and rotor of the high speed stirring apparatus and the surface of each granule is molten in a moment at portions at which the granules come into friction and collision, while, since the inner portion of the granules remains at temperatures below the melting point of the polyolefin and is molten only the surface portion and the granules are stirred violently, the granules do not sinter or cohere with each other to form lumps.

The conditions of such high speed stirring vary depending on the individual high speed stirring apparatus, for instance, in the case of high-intensity, vortical-action mixer (rf. "Encyclopedia of Polymer Science and Technology," vol. 4, pp. 124, Interscience Pub., New York, N.Y. (1966)), e.g., Henschel mixer the conditions vary depending on the revolving speed of stirring blades, the peripheral speed of stirring blades, shape of stirring blades and the shape of mixing tank, and other factors. In effect, these factors are insignificant so long as the surface of polyolefin granules is molten in a moment at portions coming into friction and collision as a result of friction and collision with each other, with the inside wall of the mixing tank and with the stirring blades. It is impossible at all to attain such a high speed stirring by means of a low speed stirring apparatus such as a drum tumbler which is driven at most at 60 r.p.m. and is attainable by the use of a high intensity, vortical-action mixer, or like high speed mixers. As the high speed stirring apparatus there may also be used, e.g., centrifugal impact mixer, high speed dispersion mixer, ribbon blender, conical dry blender, double arm mixer, vortical action mixer etc. as described in "The Encyclopedia of Plastic Equipments" by Herbert R. Simons, Reinhold Pub. Corp., New York, N.Y. (1964), as it is or after modification (for instance, increase of driving power) to make it suitable for high speed stirring. As a result of such high speed stirring the crosslinking agent penetrates and diffuses into the granules of polyolefin through the molten surface layer. The mechanism of the penetration and diffusion is a combination of the following mechanism (I) to (III). Namely, (I) crosslinking agent which is solid at the working temperature (the working temperature means, hereinafter, the temperature of the inside wall of the mixing tank of the high speed stirring apparatus and of the polyolefin granules within said mixing tank before start of stirring) melts as a result of elevation of the temperature in the mixing tank by heat generated by friction and collision of polyolefin granules with each other, with the inside wall of the mixing tank, and with the stirring blades of the high speed stirring apparatus penetrates and diffuses into the granules of polyolefin through the unmolten areas of the surface of polyolefin granules (areas in which no fusion has been caused by friction and collision) by liquid (liquid or liquefied crosslinking agent) -solid (polyolefin granules) diffusion. Liquid crosslinking agent which has a melting point below the working temperature and is already in liquid state before start of stirring, penetrates and diffuses into the granules of polyolefin as above. (II) The liquid or liquefied crosslinking agent penetrates and diffuses into the granules of polyolefin through the molten areas of the surface of polyolefin granules by liquid (liquid or liquefied crosslinking agent) -liquid (molten areas of the surface of polyolefin granules) diffusion. (III) A liquid or powdery crosslinking agent on the surface of polyolefin granules is forced by the mechanical impact arising from or collision into the molten part of polyolefin granules. It seems, however, that the quantity of the crosslinking agent penetrated into the granules of polyolefin by the mechanism (I) is very small compared with that penetrated by the mechanism (II) and (III).

As disclosed hereinafter, antioxidants, fillers and other compounding ingredients may be incorporated, if desired, in the polyolefin granules, and, also in this case, it is necessary for such ingredients to penetrate and diffuse into the granules of polyolefin. The mechanism of the penetration of the antioxidant into the granules of polyolefin is as follows. Among antioxidants those being molten and liquefied by the elevation of the temperature in the mixing tank during high speed stirring penetrate and diffuse into the granules of polyolefin in the mechanism as (I) to (III) as mentioned above and those having higher melting points, as they remain in powdery state, are forced into the molten layer of the surface of polyolefin granules by the mechanical impact in the mechanism as (III) mentioned above and part of them in the form of a solution in the crosslinking agent which has been liquefied during high speed stirring penetrate through the molten layer of the surface of polyolefin granules in the mechanism as (I) to (III) as mentioned above. The fillers penetrate and diffuse into the molten layer of the surface of polyolefin granules in the mechanism as (I) as mentioned above.

Since the antioxidant is usually incorporated in a smaller amount than the crosslinking agent, in the stage where the major portion of the crosslinking agent has penetrated and diffused into the granules of polyolefin, almost all of the antioxidant has substantially penetrated into granules of polyolefin.

Since the rate of diffusion of a liquid in another liquid (excluding combinations of completely incompatible liquids) is in general higher than that of a liquid in a solid or that of a solid in a solid, the liquefied crosslinking agent penetrates and diffuses into the granules of polyolefin at a higher rate when the surface of polyolefin granules is in molten state than in solid state.

Moreover, when the crosslinking agent does not melt and exists in powdery state during high speed stirring, it cannot be expected that the crosslinking agent penetrates into polyolefin granules rapidly unless the surface of polyolefin granules is in the state of melt (aforementioned mechanism (III)).

FIG. 1 indicates the relationship between the required mixing time, i.e., the time necessary for stirring until the residual amount of a crosslinking agent incorporated is reduced to at most 0.5 part by weight per 100 parts by weight of polyethylene and the revolving speed of the stirring blades of Henschel mixer (as explained in detail hereinafter) in the preparation of curable polyethylene granules by use of Henschel mixer to penetrate and diffuse the crosslinking agent into the granules of polyethylene. In FIG. 1, Curve I is the case of a working temperature of 30° C. within the range of room temperature, and Curve II is at 70° C. In this experiment, 2 phr. of dicumyl peroxide was used as crosslinking agent. As obvious from the FIG. 1, the required stirring time decreases with increase of the revolving speed of the stirring blades, and the higher the working temperature, the shorter the required stirring time.

In the case of the working temperature of 30° C. (Curuve I in FIG. 1), when polyolefin granules such as polyethylene granules (solid) and crosslinking agent such as dicumyl peroxide (powdery solid) are stirred together at high speed in a Henschel mixer, the temperature of the inside wall of the mixing tank of the Henschel mixer mixer and of the polyethylene granules rises as a result of friction and collision between polyethylene granules with each other, and between polyethylene granules and the inside wall of the mixing tank and stirring blades, and consequently the friction and/or collision areas of the surface of each polyethylene granule melts, while the crosslinking agent fuses as a result of temperature rise in the mixing tank due to said friction and collision. Explaining the above in more detail, in the case where the working temperature is 30° C., the dicumyl peroxide cannot penetrate and diffuse into the granules of polyethylene at the start of stirring because both the dicumyl peroxide and polyethylene granules are in a solid state. Soon after the start of high speed stirring, the dicumyl peroxide melts as a result of the rise in temperature of the mixing tank and penetrates and diffuses into granules of polyethylene through unmolten surface of polyethylene granules in the mechanism (I). However, in this stage, the rate of diffusion is small because the diffusion of liquid-solid predominates. Continuing the high speed stirring, the surface of polyethylene granules melts as mentioned above and the molten dicumyl peroxide penetrates and diffuses into the granules of polyethylene through the molten surface layer of each granule in the mechanism (II) as mentioned above. In this stage, the rate of diffusion suddenly becomes higher because the diffusion between liquid and liquid becomes predominant.

Referring to FIG. 1, the section A of the Curve I indicates a region in which there occurs merely diffusion of liquid (molten dicumyl peroxide) -solid (polyethylene granules), and in this region the rate of diffusion is small and the required stirring time is long. Increasing the revolving speed of the stirring blades to 500 r.p.m. or more to stir more vigorously as to cause the surface of polyethylene granules to melt, there occurs in general a diffusion of liquid (molten dicumyl peroxide) -liquid (molten surface layer of polyethylene granules) and, consequently, the rate of diffusion suddenly becomes higher and the required stirring time is suddenly shortened.

The reason for performing a high speed stirring as to cause "the surface of polyolefin granules to melt" is to cause the liquid-liquid diffusion predominantly and to shorten the required stirring time. As mentioned above, in the region A in FIG. 1, there occurs a liquid (molten dicumyl peroxide) -solid (polyethylene granules) diffusion predominantly so that the required stirring time is too long and such compounding ingredients that are infusible during high speed stirring at elevated temperatures in the mixing tank of a high speed stirring apparatus as, e.g., antioxidants and fillers having high melting point are hardly forced into the granules of polyethylene the surface of which is unmolten. Accordingly, polyethylene granules thus obtained are apt to bring about non-uniform dispersion of ingredients when transferred by pneumatic carrier or fed into an extruder. This is the reason why we exclude low speed stirring as in the region A in the present invention (refer to comparative Example 4 described hereinafter).

In the case where the working temperature is higher than room temperature, e.g. 70° C. (Curve II in FIG. 1), the dicumyl peroxide is already in molten state before the start of stirring. And the dicumyl peroxide starts to penetrate and diffuse into the granules of polyethylene immediately just after the beginning of stirring by liquid (molten dicumyl peroxide) -solid (polyethylene granules) diffusion, immediately while the rate of diffusion is small. Continuing the stirring, the surface of polyethylene granules is locally molten more easily than in case that the working temperature is room temperature (Curve I) by friction and collision. Accordingly, there occurs liquid-liquid diffusion in a larger extent than in the case of the Curve I. And the rate of diffusion is higher owing to the higher working temperature so that the required stirring time is shortened. This is the reason why the required stirring time in the case of the Curve II is shorter than that in the case of the Curve I (working temperature being room temperature) even at the same stirring speed.

Figure 2:
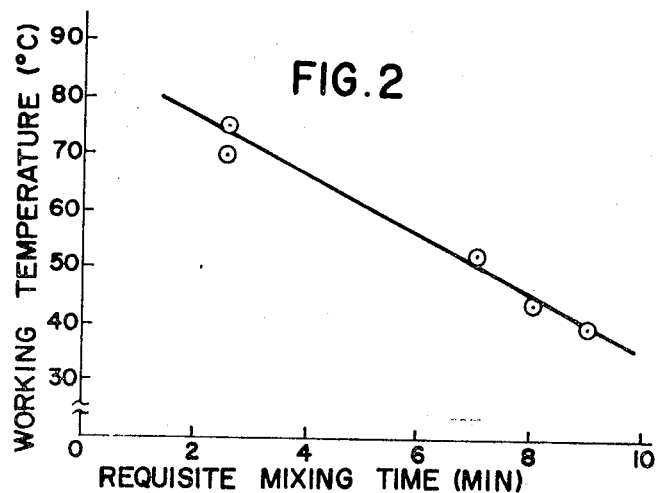
FIG. 2 illustrates the relationship between working temperature and mixing time with a Henschel mixer similarly as in FIG. 1.

FIG. 2 shows the relationship between the working temperature and the required mixing time. As obvious from this figure, the higher the working temperature, the shorter the required stirring time. However, in case of attempting to shorten the required stirring time by raising the working temperature, it is necessary to give notice to the following two points: that when the working temperature is set too high, the dicumyl peroxide will completely penetrate and diffuse into the granules of polyethylene before it is uniformly dispersed with polyethylene granules and, consequently, the concentration or amount of dicumyl peroxide penetrated into polyethylene granules varies in every granule. And that when the working temperature is set near the melting point of polyethylene, the polyethylene granules tend to sinter or cohere into lumps before or during high speed stirring. In the experiment for FIG. 2, the same Henschel mixer was employed as in the experiment for FIG. 1, and the amount of dicumyl peroxide added was 2 phr. based on polyethylene granules, and a revolving speed of the stirring blades of the Henschel mixer was 2760 r.p.m.

It should be noticed that the required stirring time varies depending on the mixers employed even if the revolving speed of the stirring blades or the working temperature is identical because the Henschel mixer employed in the experiments for FIGS. 1 and 2 is different from those employed in comparative Example 4 and Example 1 to 11 as explained hereinafter in the capacity of mixing tank, the diameter of stirring blades and other features.

The Henschel mixer employed in the experiments for FIGS. 1 to 2 is a Henschel mixer FM 20/L manufactured by Mitsui-Miike Manufacturing Co. having a shape and performance as follows:

Total capacity: 20 liters
Effective capacity: 12 liters
Shape of stirring blades: Sharp type
Number of stirring blades: Each two, upper and lower (total, four blades)
Diameter of stirring blades: 280 mm., both upper and lower (total length of two blades)

Revolving speed of stirring blades:
  at high speed 2800 r.p.m.
  at low speed 700 r.p.m.
Peripheral speed of stirring blades:
  at high speed 41 m./sec.
  at low speed 10 m./sec.
Rated output of electric motor: 3.7 kw.

In the present invention, the residual amount of cross-linking agent on the surface of polyolefin granules is restricted to at most 0.5 part by weight per 100 parts by weight of polyolefin because if it exceeds 0.5 part pneumatic transfer is difficult as in the case of the method disclosed in Japanese Patent No. 501,087. Otherwise, because it is difficult for the resulting granules to be picked up smoothly by the screw of an extruder, extruded articles of irregular dimensions are obtained. Further non-uniform dispersion of ingredients is brought about.

Figure 3:
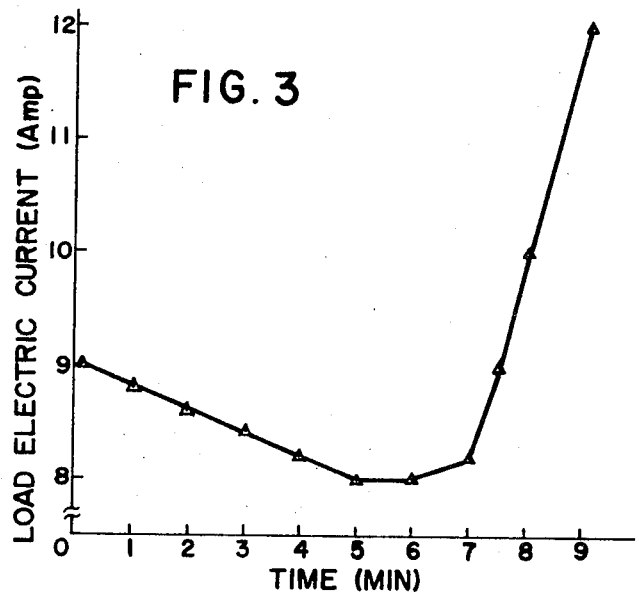
FIG. 3 illustrates the relationship between load current and stiring time with a Henschel mixer similarly as in FIG. 1.

Observing the change in the appearance of polyethylene granules during a high speed stirring of polyethylene granules and dicumyl peroxide in Henschel mixer at a working temperature of room temperature, in the initial stage of stirring, dicumyl peroxide fuses as the temperature in the mixing tank rises as a result of friction and collision of polyethylene granules with each other, with the inside wall of the mixing tank and with the stirring blades. In this stage, the surface of polyethylene granules which is covered by viscous oily substances (molten or fused dicumyl peroxide). On further stirring, the oily substances disappear within a relatively short period of time. In this stage where the oily substances have disappeared, the major portion of dicumyl peroxide has penetrated and diffused into the granules of polyethylene. The load current of the electric motor driving the mixer suddenly increases in the subsequent stage. In this condition, the residual amount of the crosslinking agent sticking on the surface of polyethylene granules is 0.5 part by weight or less per 100 parts by weight of polyethylene. The sudden increase in the load current is attributable to the facts that the molten dicumyl peroxide which serves as lubricant in the earlier stage on polyethylene granules has penetrated and diffused into the granules of polyethylene and that the temperature of the polyethylene granules rises as a result of high speed stirring in unlubricated state and the surface of polyethylene granules becomes sticky to increase the resistance to stirring. FIG. 3 shows the relation between the load current and the stirring time; the Henschel mixer used in this experiment is the same as employed in the experiment for FIGS. 1 and 2. In this experiment, polyethylene granules are stirred together with 2 phr. of dicumyl peroxide at a revolving speed of 2760 r.p.m. and at a working temperature of 40° C. As indicated by FIG. 3, the load current gradually decreases after initiation of stirring. The decrease in load current implies the fact that the dicumyl peroxide is liquefied with rise in temperature and is uniformly dispersed on the surface of polyethylene granules to serve as lubricant. While in the beginnng of ths stage there occurs predominantly diffusion of liquid (molten dicumyl peroxide) -solid (polyethylene granules), during subsequent high speed stirring the diffusion of liquid (molten dicumyl peroxides) -liquid (molten layer of polyethylene granules) occurs predominantly as the surface of polyethylene granules is molten by friction and/or collision. As a result of the liquid-solid diffusion and the liquid-liquid diffusion, the major portion of dicumyl peroxide has penetrated and diffused into the granules of polyethylene. On this stage, because the lubricant disappears the load current starts suddenly to increase and, further continuing the high speed stirring, the surface of polyethylene granules becomes sticky to increase the resistance to stirring and the load current increase furthermore. In this experiment, dicumyl peroxide has penetrated and diffused almost completely into the granules of polyethylene within about 6 minutes (about 6 minutes after the initiation of high speed stirring the load current starts to increase suddenly). Accordingly, in the present invention the increase in load current may be taken as a guide for the end of the high speed stirring.

The polyolefin used in the present invention includes homopolymers and copolymers of olefins, such as polyethylene, polypropylene or ethylene-propylene crystalline copolymer, crystalline copolymers of olefin with other monomer, such as ethylene-vinyl acetate crystalline copolymer and ethylene-ethyl acrylate crystalline copolymer, or mixture thereof. Polyolefin available in commercial market are divided into two groups in their form, granules and powders.

The reason why the polyolefin used in the present invention is restricted to those in granular form is that it is unexpected for polyolefin in powdery form to obtain a friction and collision effect by high speed stirring—an effect that the surface of polyolefin granules fuses or melts in friction and collision areas as a result of friction and collision of the polyolefin granules with each other, with the inside wall of mixing tank of the high speed stirring apparatus, and with the stirring blades, caused by high speed stirring and a crosslinking agent penetrates and diffuses into the granules of polyolefin through the said fused or molten surface layer and that polyolefin in the form of powder is incapable of being stirred at high speed at an elevated temperature without any trouble because the polyolefin powder fuses and coheres into lumps at a high temperature.

The shape of polyolefin granules may be cubic or cylindrical, and it is preferred for the granules to have an average size of at least 0.5 mm. from the view point of attaining the friction and collison effect as mentioned above, i.e., of attaining the object of the present invention, though the shape of polyolefin granules is not limited as above. Here the average size of granules is determined by first exactly weighing one hundred granules taken at radom from 25 kg. of polyolefin granules, average weight of granule is calculated, and then the average size is calculated assuming that each granule has a cubic form. Almost all of the granules now available in commercial market are useful in the present invention.

Typical crosslinking agents useful in the present invention are dicumyl peroxide, 2,5-dimethyl-2,5-di-(tert-butylperoxy) - hexane, 2,5 - dimethyl-2,5-di-(tert-butyl-peroxy)-hexyne-3 and like organic peroxides, optionally, in combination with crosslinking coagents, such as triallyl isocyanurate, triallyl cyanurate or diallyl phthalate. Usually, when 1 part by weight or more of an organic peroxide crosslinking agent is incorporated in 100 parts by weight of polyethylene, a sufficient degree of crosslinking will be attained without using any crosslinking co-agent. Accordingly, a crosslinking coagent is incorporated in the amount of, usually, 0.5 to 10 parts by weight per 100 parts by weight of polyethylene when the amount of the incorporated organic peroxide is less than 1 part by weight per 100 parts by weight of polyethylene.

The crosslinking coagent may be incorporated, however, also in the case where the organic peroxide crosslinking agent is incorporated in the amount of more than 1 part by weight.

In the practice of the present invention, may be incorporated, if desired, antioxidants, such as 4,4'-thiobis (6 - tert - butyl - m-cresol), 1,2-dihydro-2,2,4-trimethyl-quinoline (including its polymerizate), bis(2 - hydroxy-3 - tert - butyl - 5 - methylphenyl)methane or dinaphthyl-p - phenylenediamine, fillers (such as carbon black) and compounding ingredients. Crosslinking retarders (anti-scorching agent) may be also incorporated, if desired, such as 2,6 - di - tert - butyl - 4 - methyl - phenol or 4,4'-thiobis(6-tert-butyl-m-cresol). Especially, when extruding and curing the curable polyolefin granules containing 2,6-di-tert-butyl-4-methyl-phenol as crosslinking retarder, said 2,6-di-tert-butyl-4-methyl-phenol inhibits the scorch of curable polyolefin granules effectively in the extruder and flies off easily from extruded polyolefin articles in the curing operation because it sublimates at low temperature, therefore said 2,6-di-tert-butyl-4-methyl-phenol does not lower the degree of crosslinking of obtained crosslinked polyolefin articles. The practical use as crosslinking retarder of 2,6-tert-butyl-4-methyl-phenol is possible only by use of the present invention because in the prior art of preparing curable polyethylene compound, said retarder flies off during mixing on an open roll mill because of high temperature necessary for the operation. Nevertheless, in the present invention said retarder can remain in the curable polyethylene compound because of the fact that the present invention needs no higher temperature during operation.

Compounding ingredients which are of very high melting points and do not melt even if the temperature in the mixing tank of a high speed stirring apparatus rises, such as fillers, are impossible to penetrate in a large amount into the granules of polyolefin, because they are forced into the molten surface layer of polyolefin granules by mechanical impact as they are in solid state. Accordingly, if a filler is incorporated in a too large quantity, there remains portion of the filler unpenetrated into polyolefin granules, and such a composition thus obtained is difficult to be transferred by pneumatic carrier without causing any non-uniform dispersion of ingredients. According to our experiments, it was found that such ingredients as inorganics fillers and some antioxidants that have very high melting points and do not melt even if the temperature in the mixing tank of a high speed stirring apparatus has risen, are impossible to penetrate in a large quantity into the granules of polyolefin, although the quantity of such solid ingredients that penetrated into the granules of polyolefin may be increased by raising the working temperature. The total amount of these ingredients having high melting point to be incorporated to the polyolefin granules is preferably less than 5 phr.

In the preparation of plasticized polyvinyl chloride compounds from polyvinyl chloride resin powder, a common process is that to the polyvinyl chloride resin powder are added plasticizers, stabilizers, and other liquid additives, and then the mixture is subjected to a high speed stirring. This procedure is distinctly different from the method of the present invention in spite of the apparent similarity. They differ with each other in the mechanism of penetration of additives into resin, and it is almost impossible to infer the method of present invention directly from the polyvinyl chloride procedure.

As is well known, polyvinyl chloride resin powder is essentially non-crystalline and in its powdered form, it is so porous that the plasticizers and other liquid additives are readily absorbed therein. It will be easily understood that the penetration of liquid additives into polyvinyl chloride resin powder is very easy from a simple observation that when 100 parts by weight of polyvinyl chloride resin powder and 60 parts by weight of liquid additive, such as plasticizer and or stabilizer, are poured in a beaker and are stirred therein by means of a glass rod the additive is absorbed completely by the polyvinyl chloride resin powder within a short period of time leaving a compound powder which is little different in its appearance from the original polyvinyl chloride resin powder.

On the contrary, since crystalline polyolefin granules are non-porous, any liquid additive hardly penetrates into the grandules of polyolefin. The liquid additive will scarcely be absorbed into the granules of polyolefin when polyolefin granules and the liquid additive are stirred in a beaker by means of a glass rod, as in the case of polyvinyl chloride resin powder. Although the rate of diffusion and penetration of the liquid additive into the granules of polyolefin may be increased to some extent by elevating the temperature, it is unexpected to attain a diffusion and penetration of a large quantity of the additive within a short period of time. That is to say, with respect to polyolefin, it is possibly unexpected that a liquid additive penetrates and diffuses in a large amount into the granules of polyolefin in a simple mechanism of absorption or diffusion as in the case of polyvinyl chloride, and it is needed a peculiar means other than simple absorption or diffusion.

In the preparation of plasticized polyvinyl chloride compounds, polyvinyl chloride resin powder is stirred with plasticizers, stabilizers and other liquid additives at elevated temperatures, preferably near the melting point of polyvinyl chloride, to effect polyvinyl chloride powder resin to absorb large quantities of the liquid additives at a high rate of absorption, namely, within a short period of time (refer to "Encyclopedia of Polymer Science and Technology," vol. 4 pp. 123 (1966)). In that case the stirring at such an elevated temperature tends to cause fusion or sintering of polyvinyl chloride powder into lumps or crumbs. Hereupon, in order to avoid the agglomeration of polyvinyl chloride powder compound into lumps it is necessary to adopt high speed stirring and cooling of the compound in the final stage of the high speed stirring as to prevent polyvinyl chloride powder compound to cohere or agglomerate into lumps after the end of stirring. That is, it is the reason why the high speed stirring is necessary in the incorporation of liquid additives in polyvinyl chloride resin powder to prevent the polyvinyl chloride powder compound from cohesion or agglomeration and it has no direct bearings on the speed of absorption of liquid additives by polyvinyl chloride powder resin.

On the contrary, in the method of the present invention, the penetration and diffusion of liquid additives are attained not in a simple mechanism. It is not expected that almost all of liquid additive penetrates and diffuses into the granules of polyolefin in a simple mechanism so far as the temperature of the granules remains below the temperature at which polyolefin melts and loses its entire crystallinity. However, to melt the polyolefin granules obstructs the attainment of the object of the present invention aiming at obtaining curable polyolefin granules which have undergone little thermal history and can be transferred by pneumatic carrier. In the method of the present invention crosslinking agents diffuse and penetrate into granules of polyolefin by subjecting the mixture of the crosslinking agents and polyolefin granules to a high speed stirring in a high speed stirring apparatus through the mechanism (I) to (III) as mentioned above. And the method of the present invention quite differs from the method of penetrating and diffusing liquid additives into polyvinyl chloride resin powder through a simple mechanism as mentioned above, in the mechanism and means for penetration and diffusion of additive into resin. It is on this ground that the method of the present invention is effective only to polyolefin granules and ineffective to polyolefin powder, and that the high speed stirring is needed to be carried out at high intensity such that polyolefin granules do not sinter with each other while the surface of granules of the polyolefin partially in a fused state.

The present invention will now be explained in more detail by the following comparative examples and examples.

Comparative Examples 1 to 3

Each composition (preheated about 50° C.) as indicated in the columns of comparative Examples 1 to 3 of the following Table 1 was put in a drum tumbler maintained at a temperature of about 50° C. and the drum tumbler was rotated at a revolving speed of 35 r.p.m. for 30 minutes to blend polyethylene granules with crosslinking agent and antioxidant. The residual amount of crosslinking agent and of antioxidant on the surface of the resulting curable polyethylene granules was determined by the procedure as described inn the following, and the results obtained are summarized also in Table 1.

Determination of the residual amount of crosslinking agent and anti-oxidant on the surface of polyolefin granules: A prescribed amount of specimen which is taken out of curable polyolefin granules obtained is washed repeatedly using a large quantity of a solvent such as methanol which only dissolves the incorporated chemicals and does not dissolve polyolefin, and then the specimen is dried in vacuo. By this treatment, the crosslinking agent and optionally incorporated antioxidant remaining on the surface of polyolefin granules are extracted. Thereafter, the amounts of organic peroxide crosslinking agent, crosslinking coagent and antioxidant are determined by a conventional quantitative analytical method such as infrared spectrophotometric analysis or gas chromatography.

Figure 4:
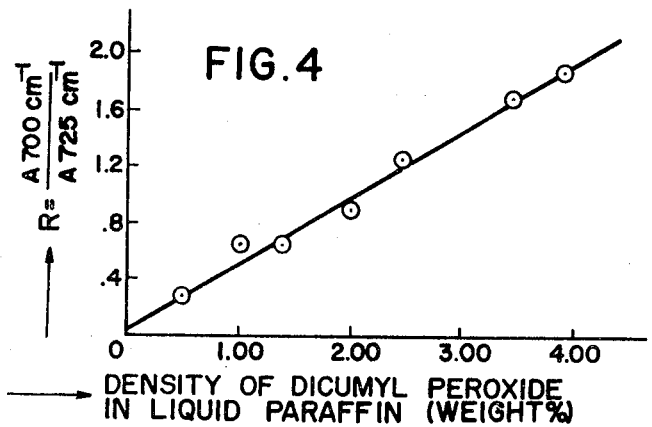
FIG. 4 illustrates the calibration curve for dicumyl peroxide in liquid paraffin.

Explaining in more detail the determination method as employed in comparative Examples 1 to 4 and Examples 1 to 11, 100 g. of curable polyethylene granules obtained is taken in a 300 cc. beaker and washed therein 5 times within total about 300 cc. of methanol at 50° C. The washing liquid is poured by decantation into a 500 cc. beaker and then the liquid is transferred little by little into an evaporating dish placed on a water bath to evaporate to dryness. The evaporating dish containing the dry residue is then completely dried in vacuo at 50° C. for 10 hours and weighed to determine the increment in weight and, thereby, to determine the total residual amount of crosslinking agent and antioxidant washed out from the surface of polyethylene granules. To determine the amount of crosslinking agent, about 0.2 g. of the dry residue is exactly weighed and dissolved in about 10 g. of exactly weighed liquid paraffin and the resulting solution is analyzed by infrared spectrophotometry. An absorption band of 725 cm.$^{-1}$ is chosen for liquid paraffin, 700 cm.$^{-1}$ for dicumyl peroxide, 760 cm.$^{-1}$ for 2,5-dimethyl-2,5-di(tert-butylperoxy)hexane, and 680 cm.$^{-1}$ as a base line, and the residual amount of crosslinking agent on the surface of polyethylene granules is calculated using a calibration curve which has previously been determined based on the ratio of the absorption intensity of liquid paraffin to that of dicumyl peroxide or 2,5-dimethyl-2,5-di(tert-butylperoxy)hexane. The calibration curve for dicumyl peroxide in liquid paraffin is shown in FIG. 4. In the case when the crosslinking coagent is incorporated the residual amount of crosslinking coagent can be determined in the same way as the organic peroxide crosslinking agent, as explained above.

Comparative Example 4

A composition as indicated in the column of comparative Example 4 in the following Table 1 was put in a mixing tank of a high-intensity, vortical-action mixer (the type is different from that employed in the experiments for FIGS. 1 to 3, details will be explained hereinafter), and stirred under the conditions as indicated in the Remarks column in Table 1 to obtain curable polyethylene granules. The results of determination of the residual amount of crosslinking agent on the surface of polyethylene granules is indicated in Table 1.

Examples 1 to 11

The compositions as indicated in the columns of Examples 1 to 11 in Table 1 were separately put in a mixing tank of a Henschel mixer (MF300A type, made by Mitsui-Miike Manufacturing Co.: details of which will be illustrated hereinafter) and subjected to a high speed stirring under the conditions as indicated in the Remarks column in Table 1 to obtain curable polyethylene granules by penetrating and diffusing crosslinking agent and antioxidant into the granules of polyethylene. The residual amount of crosslinking agent and antioxidant on the surface of polyethylene granules was determined by the method as mentioned above, and the results are indicated in Table 1, too.

TABLE I

|  | Comparative Example | | | | Example | | | | | | | | | | |
|---|---|---|---|---|---|---|---|---|---|---|---|---|---|---|---|
|  | 1 | 2 | 3 | 4 | 1 | 2 | 3 | 4 | 5 | 6 | 7 | 8 | 9 | 10 | 11 |
| Polyethylene-1 | 100 |  | 100 |  |  |  |  |  |  |  | 100 | 100 |  | 100 |  |
| Polyethylene-2 |  | 100 |  | 100 | 100 | 100 | 100 | 100 | 100 | 100 |  |  | 100 |  | 100 |
| Dicumyl peroxide | 3.0 |  | 0.3 | 3.0 | 0.3 | 0.5 | 1.0 | 2.0 | 3.0 | 5.0 | 3.0 | 3.0 | 0.3 |  | 2.0 |
| 2,5-dimethyl-2,5-di(tert-butylperoxy)hexane |  | 3 |  |  |  |  |  |  |  |  |  |  |  | 3 |  |
| Triallyl cyanurate |  |  |  |  | 0.7 |  | 0.7 | 0.5 |  |  |  |  | 0.7 |  |  |
| Diallyl phthalate |  |  |  |  |  |  |  |  |  |  |  | 0.5 |  |  |  |
| 4,4'-thiobis(6-tert-butyl-m-cresol) |  |  | 0.5 |  |  |  |  |  |  |  | 0.5 |  | 0.5 |  |  |
| Polymerized 1,2-dihydro-2,2,4-trimethyl-quinoline |  |  |  |  |  |  |  |  |  |  |  | 0.5 |  |  |  |
| Residual amount of organic peroxide crosslinking agent on the surface of polyethylene granules (A) | 2.7 | 2.6 | 0.2 | 2.1 | 0.05 | 0.05 | 0.1 | 0.15 | 0.15 | 0.4 | 0.1 | 0.1 | 0 | 0.1 | 0.15 |
| Residual amount of crosslinking coagent on the surface of polyethylene granules (B) |  |  | 0.6 |  | 0.05 | 0.05 |  |  |  |  |  | 0.05 | 0.05 |  |  |
| Residual amount of crosslinking agent on the surface of polyethylene granules (A+B) | 2.7 | 2.6 | 0.8 | 2.1 | 0.1 | 0.1 | 0.1 | 0.15 | 0.15 | 0.4 | 0.1 | 0.15 | 0.05 | 0.1 | 0.15 |
| Residual amount of antioxidant on the surface of polyethylene granules |  |  | 0.5 |  |  |  |  |  |  |  | 0.05 | 0 | 0 |  |  |
| Remarks: |  |  |  |  |  |  |  |  |  |  |  |  |  |  |  |
| Revolving speed and peripheral speed of stirring blades, and stirring time |  |  |  | (1) | (2) | (2) | (2) | (2) | (2) | (2) | (2) | (3) | (2) | (2) | (4) |
| Working temperature, ° C | 50 | 50 | 50 | 30 | 30 | 30 | 30 | 30 | 30 | 30 | 30 | 30 | 30 | 30 | 50 |

¹ a=575 r.p.m. for 5 mins.; b=20 m./sec.
² a₁=575 r.p.m. for 3 mins.; a₂=1,150 r.p.m. for 7 mins.; b=40 m./sec.
³ a=1,150 r.p.m. for 10 mins.; b=40 m./sec.
⁴ a₁=575 r.p.m. for 3 mius.; a₂=1,150 r.p.m. for 6 mins.

NOTE.—(I) Numerals indicate parts by weight unless otherwise specified; (II) Polyethylene-1: a polyethylene having the melt index of 2.0 and the density of 0.92, the trade name is "NUC 9026" made by Nippon Unicar Co., in the form of cylindrical granule of an average granule size of 2.5 mm.; (III) Polyethylene-2: a polyethylene having the melt index of 1.0 and the density of 0.92, the trade name is "Yukalon ZF-36", made by Mitsubishi Petrochemical Co., Ltd. in the form of cubic granule of an average granule size of 3 mm.; (IV) a, in the Remarks column: revolving speed of stirring blades (a₁ is of initial stage and a₂ of second stage driven at higher speed), b, in the Remarks column: peripheral speed of stirring blades at revolving speed a or a₂.

Comparative Examples 1 to 3 (corresponding to the method as disclosed in Japanese Patent No. 501,987)

In the curable polyethylene granules obtained in the comparative Examples 1 to 3, the most portions of crosslinking agent and antioxidant remained on the surface of polyethylene granules, as indicated by Table 1. When the curable polyethylene granules thus obtained were fed to an extruder of which the temperature of hopper section was 50° to 60° C., the crosslinking agent remaining on the surface of polyethylene granules fused, and the fused or molten crosslinking agent served as lubricant to make polyethylene granules too slippery to be caught by the screw of the extruder. And it was impossible to extrude satisfactorily crosslinked polyethylene insulation on the electric conductor. On the other hand, when the hopper section was cooled by water to be kept at a temperature of 10 to 15° C., to prevent the crosslinking agent on the surface of polyethylene granules from fusing, the granules were well caught by the screw of the extruder, while the crosslinking agent was separated from the surface of polyethylene granules by microvibration of hopper section which was unavoidable in operation of extruder, resulting in non-uniform dispersion of ingredients. When the temperature of the resulting curable polyethylene granules was 50° C., which was higher than the melting point of the dicumyl peroxide, it proved unsuccessful to transfer the granules by pneumatic carrier because the molten, sticky dicumyl peroxide which covered the surface of granules prevented them from free flowing. In fact, the curable polyethylene granules had a tendency to agglomerate into lumps. It was tried to transfer the resulting curable polyethylene granules to the extruder by pneumatic carrier after the granules were cooled to a temperature below the melting point of the crosslinking agent, the crosslinking agent was separated from the surface of polyethylene granules by the impact imposed by the air stream in pneumatic carrier.

Comparative Example 4

The same composition as that of comparative Example 1 was stirred using a Henschel mixer (as explained in detail hereinafter) instead of a drum tumbler at a lower revolving speed and peripheral speed of the stirring blades for a short time (5 minutes), compared with the conditions as in the following Examples 1 to 11. In this case, the surface of polyethylene granules did not melt due to the low stirring speed and short stirring time. And the major portion of the crosslinking agent added remained on the surface of curable polyethylene granules thus obtained, as indicated in Table 1. The granules were impossible to be pneumatically transferred without any trouble, as in the case of the comparative Examples 1 to 3. They were hardly caught by the screw of an extruder or it occurred non-uniform dispersion of the crosslinking agent in the hopper.

Examples 1 to 6

Where an organic peroxide crosslinking agent was incorporated in polyethylene granules in increasing amount of 0.3, 0.5, 1.0, 2.0, 3.0 and 5.0 phr, respectively, and each composition was subjected to a high speed stirring in a Henschel mixer (same as the one in comparative Example 4), almost all of the crosslinking agents penetrated and diffused substantially into the granules of polyethylene in cases of lower amounts of organic peroxide crosslinking agent (0.3 to 3.0 phr, Examples 1 to 5) and little crosslinking agent remained on the surface of polyethylene granules. Even in case of higher amount of organic peroxide crosslinking agent (5.0 phr, Example 6), the residual amount of the crosslinking agent was 0.4 part by weight per 100 parts by weight of polyethylene. Consequently, the resulting curable polyolefin granules did not agglomerate into lumps at all during the high speed stirring and the storage for two months. When said granules thus obtained were directly transferred from the Henschel mixer to a continuous vulcanizer to extrude the coating on an electric conductor, without any trouble in pneumatic transferation and in extrusion, as in the cases of comparative Examples 1 to 4, and causing any scorch during a continuous extrusion for a long period of time. A crosslinked polyethylene insulated cable thus obtained had a good dielectric property and good physical and mechanical properties.

The composition in Example 5 and comparative Example 1 is the same, nevertheless curable polyolefin granules obtained in Example 5 in accordance with the present invention have good properties as mentioned above on the contrary, the curable polyolefin granules obtained in comparative Example 1 in accordance with the invention disclosed in Japanese Patent 501,087, have the shortcomings as mentioned above. In comparative Example 4, not only the composition but the high speed stirring apparatus used in the same as in Example 5, the curable polyolefin granules obtained in comparative Example 4 have the shortcomings as mentioned above, while the curable polyolefin granules obtained in Example 5 have excellent properties mentioned above.

The reason of such differences is easily understood by comparing the residual amounts of organic peroxide crosslinking agent on the surface of polyethylene granules indicated in Table 1.

Example 7

A different grade of polyethylene from that used in Example 5 was subjected to a single stage high speed stirring (in Examples 1 to 6, the high speed stirring was performed in two stages) with a crosslinking agent and an antioxidant to obtain a curable polyolefin granules substantially free from residual organic peroxide crosslinking agent and antioxidant on the surface of polyethylene granules. Said granules could be pneumatically transferred and extruded without any trouble in virtue of the small residual amount (0.1 part) of the crosslinking agent on the surface of polyethylene granules. A crosslinked product was obtained having good physical, anti-aging and dielectric properties.

Thus, in the present invention, there is no essential difference in results whether the high speed stirring is performed in single stage or in two stages.

Example 8

Curable polyethylene granules of a composition with crosslinking coagent was obtained by high speed stirring in the same Henschel mixer as employed in Examples 1 to 6. The residual amount of crosslinking agent on the surface of the granules was as small as 0.15 parts by weight wherein dicumyl peroxide was 0.1 part by weight and diallyl phthalate (crosslinking coagent) was 0.05 part by weight. The granules had the substantially identical properties with those of Example 7 except that they gave a crosslinked product of a somewhat higher degree of crosslinking than those of the Example 7 gave.

Example 9

Curable polyethylene granules having substantially the same properties with those of Example 8 were obtained by subjecting the same composition as in comparative Example 3 but to a high speed stirring under the same conditions as in Examples 1 to 6 and 8.

Example 10

Curable polyethylene granules having a very small residual amount of crosslinking agent on the surface of polyethylene granules, compared with that in comparative Example 2 as indicated by Table 1, were obtained by subjecting the same composition with that in comparative Example 2 under the same conditions with those in Examples 1 to 6 and 8. The crosslinked product obtained by heating the curable extruded article thus obtained had the substantially same properties with those obtained in Examples 1 to 8 except that it was somewhat lower in the degree of crosslinking (inherently 2,5-dimethyl-2,5-di(tert-butylperoxyl)hexane gives a crosslinked product of a lower degree of crosslinking than dicumyl peroxide gives, if the same amounts of peroxide are incorporated.

EXAMPLE 11

Polyethylene granules were stirred with 2 phr. of dicumyl peroxide in the similar manner as in Example 5 except that the working temperature was raised to 50° C. and the stirring time was somewhat shortened to obtain curable polyethylene granules in which the residual amount of crosslinking agent on the surface of polyethylene granules was substantially equal that in Example 5. In the practice of the present invention, the working temperature may be above room temperature and, in this case, the required stirring time may be shortened. However, in cases where the required stirring time is shortened by elevating the working temperature, non-uniform dispersion or distribution of ingredients may occur. According to high speed stirring of the present invention, it is obvious (see Examples 1 to 11) that the same result is expected when said high speed stirring is performed either with single stage (exhibited in Example 7) or with two stages. Said single stage high speed stirring means that the revolving speed of stirring blades is sufficiently high constantly from beginning to end. And said two-stage high speed stirring means that the revolving speed of stirring blades is kept relatively low at the beginning (accordingly, in this stage the friction and collision effect is too poor to let almost all of the crosslinking agent to penetrate and diffuse into the granules of polyolefin, but almost all of the crosslinking agent is able to penetrate and diffuse into the granules of polyolefin so long as said low speed stirring continue for sufficiently long time (see FIG. 1), and the revolving speed of stirring blades is increased suddenly in the next stage.

When high speed stirring is carried out at high working temperatures, said two-stage high speed stirring is more favorable than said single stage high speed stirring because of the following reason. By raising the working temperature, we can shorten the required stirring time as is seen in FIG. 2 and also in a comparison between Examples 4 and 11. Therefore, it is very profitable to raise working temperature during high speed stirring. However, if the working temperature is raised too high, a problem arises from excessive shortening of the required stirring time; that is, the crosslinking agent is apt to penetrate and diffuse into some of the polyolefin granules before the crosslinking agent disperses uniformly among the granules. Accordingly, the amount of penetrated crosslinking agent varies by individual granules, and there occurs the possibility of non-uniform dispersion of crosslinking agent throughout the compound. Even when the working temperature is high, so far as the two-stage high speed stirring is employed, the crosslinking agent and polyolefin granules are mingled uniformly during the first low speed, few minutes stirring, and the crosslinking agent, which is mingled uniformly in polyolefin granules, penetrates rapidly into polyolefin granules uniformly in short time during the second high speed stirring. Namely, two-stage high speed stirring can afford high working temperatures so as to shorten the required stirring time without the danger of non-uniform dispersion of crosslinking agent. However, there is no obstruction whether said high speed stirring is performed with a single stage, or two or with more stages, and whether the working temperature is high or low, provided said selection fits to our invention.

Heretofore explanations were made of the practice of the present invention in batch process, the method of the present invention may be carried out in continuous manner by continuously supplying polyolefin granules, crosslinking agent and other ingredients to a high speed stirring apparatus and withdrawing the resulting granules from the apparatus.

The Henschel mixer as employed in comparative Example 4 and Examples 1 to 11 will now be explained in detail with reference to the drawings.

Figure 5:
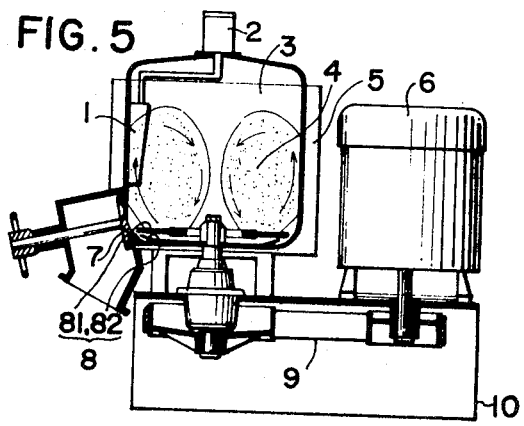
FIG. 5 is a side elevation view, in partial section, of a Henschel mixer.

In FIG. 5, showing a side elevation view, in partial section, of a Henschel mixer, 1 is a rotary deflector, 2 is an electric motor equipped with speed-reducing gear, 3 is a mixing tank, 4 is polyolefin granules, 5 is a heating or cooling jacket, 6 is a main electric motor, 7 is a discharge door, 8 indicates stirring blades, 81 indicates upper blades and 82 indicates lower blades, 9 is a transmission, and 10 is a frame. The Henschel mixer (FM 300A) manufactured by Mitsui-Miike Manufacturing Co. has the performances as follows:

Total capacity: 300 liters
Effective capacity: 200 liters
Shape of stirring blades: Sharp type
Number of stirring blades: Each two, upper and lower (total four blades)
Diameter of blades: 700 mm., both upper and lower (total length of a set of blades)

Revolving speed of stirring blades:
  at high speed: 1150 r.p.m.
  at low speed: 575 r.p.m.
Peripheral speed of stirring blades:
  at high speed: 42 m./sec.
  at low speed: 21 m./sec.
Rated output of main electric motor: 75/55 kw.

Figure 6A:
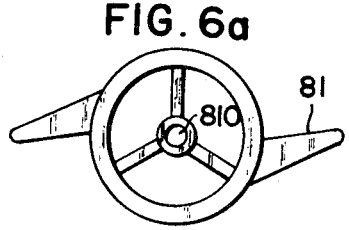
FIG. 6a is a plan view of the upper blades of a Henschel mixer.
Figure 7A:
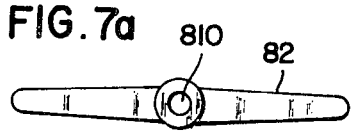
FIG. 7a is a plan view of the lower blades of a Henschel mixer.
Figure 6B:
Figure 7B:
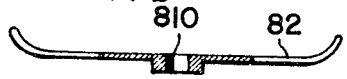

In the apparatus of the construction as mentioned above, the revolution of the electric motor 6 is transmitted through the transmission 9 to the stirring blades 8 located in the mixing tank 3 to rotate the stirring blades 8 at a high speed. The polyolefin granules in the mixing tank are thus vigorously stirred, forced upwards along the inside wall of the mixing tank from the bottom of the mixing tank, then thrown down to the center portion of the mixing tank 3, thus circulated in the mixing tank in the state of whirlpool with repeating ascendance and descendance. The polyolefin granules 4 stuck to the inside wall of the mixing tank are scraped off by means of a rotary deflector 1 driven at a low speed in the adverse direction with respect the stirring blades 8 by a low speed motor 2. The rotary deflector or scraper makes the state of whirlpool of the polyolefin granules complicated and enhances the stirring effect. The mixing tank may be heated or cooled if desired. After the end of stirring, the polyolefin granules 4 are discharged from the mixing tank 3 through the discharge door 7. In cases where the curable polyolefin granules are transferred by pneumatic carrier to the hopper of a continuous vulcanizer, the granules emerging from the discharge door 7 are collected in a suitable container, taken out of the container at a constant rate by means of a rotary feeder fitted to the container and introduced into a pneumatic carrier and transferred into the hopper of the continuous vulcanizer by means of, e.g., compressed air. The revolving speed of the stirring blades 8 can be varied optionally by the use of a pole change motor as the main electric motor. FIG. 6a is a plan view of the upper blades 81 and FIG. 6b is a cross-sectional view of the upper blades. In the FIGS. 6a and 6b, 810 indicates an axial bore. FIG. 7a is a plan view and FIG. 7b is a cross-sectional view of the lower blades 82, 810 indicating an axial bore.

The results of long time dielectric strength test on specimens (Specimen No. 1 to 5 in Table 2) of crosslinked polyethylene insulated cables manufactured by using the curable polyethylene granules obtained in Example 4 are shown in Table 2. For comparison, the results of long time dielectric strength test on specimens (Specimen No. 6 to 10 in Table 2) of crosslinked polyethylene insulated cables manufactured by using curable polyethylene granules of the composition as above, prepared by plasticating and mixing and subsequently granulating using a two roll mill and a pelletizer are also shown in Table 2. The 6.6 kv. crosslinked polyethylene insulated electric cables employed in this test are such that have been manufactured as follows: A semiconducting tape is wrapped around a stranded copper conductor of a cross-sectional area of 60 mm.$^2$, then curable polyethylene is extruded on said conductor by an extruder in 4 mm. thickness, and then heated in a continuous vulcanizing tube to effect crosslinking of the polyethylene, and finally a semiconducting tape and a shielding metallic tape are wrapped over the insulation in turn.

Long time dielectric strength test: The voltage at which the insulation of the cable is broken (insulation breakdown voltage) is determined by applying an A.C. voltage of 30 kv. for 1 hour between the conductor and external shielding layer (shielding metallic tape) of a specimen of a 6.6 kv. crosslinked polyethylene insulated cable and then raising the applied voltage stepwise at a rate of 5 kv./30 mins.

TABLE 2

| Specimen Number | Breakdown voltage (k.v.) | Time until insulation breakdown (minutes) |
| --- | --- | --- |
| 1 | 100 | 25 |
| 2 | 105 | 25 |
| 3 | 125 | 13 |
| 4 | 100 | 20 |
| 5 | 100 | 20 |
| 6 | 65 | 21 |
| 7 | 95 | 7 |
| 8 | 110 | 8 |
| 9 | 95 | 5 |
| 10 | 70 | 10 |

As obvious from the above table, the crosslinked polyethylene insulated cable manufactured by using curable polyethylene granules prepared in the method of the present invention has noticeably excellent dielectric characteristics compared with one manufactured by using curable polyethylene granules prepared in a prior method using a two roll mill and a pelletizer. It should be noticed that the variation in the value of a breakdown voltage of the cables manufactured according to the present invention is very small, that is, the granules prepared in accordance with the present invention have the advantage that it is possible to manufacture cross-linked polyethylene insulated cables with uniform dielectric characteristics.

According to the process of the present invention, since receiving mixing and transfer of the materials to the hopper of extruder can be performed consistently in a closed system, the materials can be free from dusts or foreign matter, which makes it possible to obtain curable polyolefin granules of a high quality. Since the granules have undergone little localized thermal history during its preparation, there occurs less problem of scorch as is frequently met in the prior method, and a continuous operation at a high speed for a long period of time is made possible by the use of the granules prepared in accordance with the present invention.

In addition, the curable polyethylene granules prepared in the method of the present invention give a crosslinked polyethylene insulated electric cable with excellent dielectric characteristics as indicated in the above Table 2.

Moreover, according to the present invention, it is possible to produce the curable polyolefin granules at a very high production rate and scarcely needs a hand. For instance, when using a two roll mill and a pelletizer, the number of men needed is 3, that is, 2 men for a two roll mill and one for a pelletizer, and the processing capacity is 50 kg./hr. when a two roll mill of 22 in. x 60 in. is employed. In the case of the method of the present invention, the processing capacity is 600 kg./hr. when a Henschel mixer of a total capacity of 300 liters is employed. In addition, the method of the present invention is simple in operation, and the cost of equipment for the practice of the present invention is very small compared with a double screw continuous mixer.

What is claimed is:

1. A method of preparing improved curable polyolefin granules containing cross-linking agent, characterized by the ability to retain said agent while feeding smoothly through mechanized and pneumatic transfer equipment, comprising:

(a) stirring in a mixing chamber with a stirring member a mixture of liquid or liquefied cross-linking agent and polyolefin granules having an average size of at least 0.5 mm.;
   (b) distributing said cross-linking agent over the surfaces of said granules and causing said cross-linking agent to penetrate and diffuse into said granules by operating said stirring member at a top speed in excess of about 7 meters per second;
   (c) continuing the agitation for a time sufficient for reducing the residual amount of the cross-linking agent on the surfaces of said polyolefin granules to 0.5 part by weight or less per hundred parts by weight of polyolefin granules; and (d) recovering the resultant polyolefin granules.

2. A method in accordance with claim 1 wherein said polyolefin is polyethylene.

3. A method in accordance with claim 1 wherein said cross-linking agent is a peroxide.

4. A method in accordance with claim 2 wherein said cross-linking agent is dicumyl peroxide.

5. A method in accordance with claim 1 wherein said stirring is performed first at a relatively low speed and then at a high speed, said relatively low speed being such that the friction and collisions of polyolefin granules caused thereby are almost insufficient to cause penetration and diffusion of the cross-linking agent into the granules except for prolonged stirring.

6. A method in accordance with claim 1 wherein said cross-linking agent is supplied to said mixing chamber in liquid form.

7. A method in accordance with claim 1 wherein said cross-linking agent is supplied to said mixing chamber in solid form.

8. A method in accordance with claim 7 wherein said cross-linking agent is dicumyl peroxide.

References Cited

UNITED STATES PATENTS

| | | | |
|---|---|---|---|
| 3,484,262 | 12/1969 | Hahn | 117—100 |
| 3,236,702 | 2/1966 | Sapiego | 117—100 |
| 3,079,370 | 2/1963 | Precopio | 260—94.9 |
| 3,591,409 | 7/1971 | Aubrey et al. | 117—138.8 X |
| 2,956,982 | 10/1960 | McCall et al. | 260—94.9 X |
| 3,054,142 | 9/1962 | Hinderer et al. | 117—100 X |
| 3,418,265 | 12/1968 | McClain | 260—94.9 X |

FOREIGN PATENTS

| | | | |
|---|---|---|---|
| 997,762 | 7/1965 | Great Britain | 117—138.8 |
| 1,025,280 | 4/1966 | Great Britain | 117—100 |
| 662,156 | 4/1963 | Canada | 117—138.8 |
| 217,090 | 1/1957 | Australia | 260—94.9 |

WILLIAM D. MARTIN, Primary Examiner

D. C. KONOPACKI, Assistant Examiner

U.S. Cl. X.R.

117—138.8 E